Patented Dec. 31, 1935

2,026,442

UNITED STATES PATENT OFFICE 2,026,442

RUBBER COMPOUNDING

Albert A. Somerville, Flushing, N. Y.

No Drawing. Application December 5, 1934, Serial No. 756,075

32 Claims. (Cl. 18—50)

My invention relates to improvements in the manufacture of vulcanized rubber products. More particularly, my invention relates to the development of improved fatigue resistance in vulcanized rubber products.

When subjected to continued flexing or to repeated stretching, vulcanized rubber progressively loses its elastic quality until rupture occurs somewhere in the region of flexure or elongation. When deterioration of this sort is the result of flexing, the term "flex cracking" is commonly used to designate both the deterioration and the apparent evidence of the deterioration. When the product is unstressed, flex cracks initially have the appearance of small cuts, as with the tip of a sharp knife, which progressively aggregate to form irregular breaks in the surface of the product. When the product is strained under stress, smaller cracks assume the appearance of small craters in the surface of the product and larger cracks and breaks appear as regions of failure extending into, eventually through, the body of the product. Such deficiencies in fatigue resistance constitute serious defects in many vulcanized rubber products. In the casing of the conventional pneumatic tire, for example, flex cracking frequently terminates the safely useful life of the casing long before the tire is worn out in terms of treadwear.

Vulcanized rubber products are also subject to deterioration as a consequence of static oxidation. Such deterioration is commonly termed "aging" and is conventionally measured by the drop in the value of some physical property such as tensile strength following exposure to an atmosphere containing oxygen in abnormally high concentration, under pressure for example, or at supernormal temperature, or both, artificially to accelerate the deterioration due to aging. Although it is frequently assumed that flex cracking, evidencing a deficiency in fatigue resistance, is a function of this same aging, an assumption on which the practice of attempting to stop flex cracking by the use of compounding agents retarding static oxidation, antioxidants, is predicated, the relation between resistance to aging and resistance to fatigue is far from a simple one. For example, compounds in which the ratio of sulfur to rubber is low, say 1%, usually show excellent resistance to aging although their fatigue resistance is usually markedly less than that of a similar compound of higher sulfur:rubber ratio, say 2.5%–3.5%. The latter type of compounds, however, will not show as good aging resistance as the first.

At the present time, the manufacturer of rubber goods attempts to select the particular compounding materials, particularly accelerators and antioxidants, and to proportion the compound, particularly with respect to the sulfur:rubber ratio, to produce a product having a maximum fatigue resistance consistent with the development of such other properties as are necessary for the particular product. This treatment of the problem is unsatisfactory in at least two respects. First, limitations imposed by the necessity for bringing other properties to fixed values are frequently inconsistent with the development of maximum fatigue resistance in this manner. Second, the maximum fatigue resistance which can be so developed is frequently insufficient, particularly in the case of products subjected to continued flexing or to repeated stretching.

I have discovered that, by using organic reducing agents such as pyrogallol and hydroquinone and an appropriate base in conjunction with catalytic antioxidants, I can produce vulcanized rubber products in which both resistance to aging and resistance to fatigue are developed to a high degree. The process of my invention comprises, essentially, the vulcanization of a rubber compound including both a catalytic antioxidant, an organic reducing agent and an appropriate base. The product of my invention comprises, essentially, the product produced by vulcanization of a compound including both a catalytic antioxidant, an organic reducing agent and an appropriate base.

I have found that the organic reducing agents useful as photographic developers are as a class useful as reducing agents in carrying out my invention and that, for the purposes of my invention, these reducing agents are effective approximately in proportion to their capacity to absorb oxygen. It has hitherto been proposed to use some reducing agents of this class as antioxidants. As antioxidants, however, such reducing agents, oxygen absorbers, are so far less effective than the catalytic antioxidants, inhibitors, subsequently developed, that these reducing agents have ceased to have practical significance as antioxidants. I use the term "catalytic antioxidant" to distinguish the antioxidants useful as such for the purposes of my invention from such reducing agents which, used in accordance with my invention, have a distinct function and accomplish a different result.

The catalytic antioxidants useful for the purposes of my invention are the aromatic secondary amines, or the reaction products of aromatic amines with aldehydes, or the reaction products of aromatic amines with ketones. They include diphenylamine, the ditolylamines, phenylalphanaphthylamine, phenylbetanaphthylamine, diphenylparaphenylenediamine, dibetanaphthylparaphenylenediamine, the reaction product of acetaldol with alphanaphthylamine, the reaction products of diphenylamine with acetone, and the reaction products of acetone with aniline. Of the catalytic antioxidants, the aromatic secondary amines, and particularly the phenylnaphthylamines, and the ketone-amine reaction products are used with special advantage in carrying out my invention.

The organic reducing agents useful for the purposes of my invention include pyrogallol, hydroquinone, catechol, chlorohydroquinone, dichlorohydroquinone, bromohydroquinone, diamylhydroquinone, paraphenylenediamine, aminocresols, para-methylaminophenol, orthomethylaminophenol, ortho-aminophenol, para-aminophenol, para-benzylaminophenol, 2-4-diaminophenol, para-hydroxydiphenylamine, 1-amido-2-naphthol-6-sulfonic acid and para-hydroxyphenylglycine.

Of these organic reducing agents, pyrogallol and hydroquinone are used with special advantage in carrying out my invention. In general, pyrogallol is, for the purposes of my invention, the most active of these organic reducing agents. Pyrogallol, however, tends to retard vulcanization. Hydroquinone either is without effect upon the rate of vulcanization or tends, slightly, to accelerate vulcanization. Hydroquinone has less tendency to discolor compounds in which it is used and therefore may be preferred when color is important. Any retarding effect of one reducing agent may be counteracted by using it in admixture with another reducing agent having an accelerating effect; for example, mixtures of pyrogallol and hydroquinone may be used as a composite organic reducing agent in carrying out my invention. In some compounds, hydroquinone may exhibit better resistance to aging. Pyrogallol is used with special advantage in compounds including substantial proportions of carbon black.

The use, together, of organic reducing agents, catalytic antioxidants and appropriate bases, in accordance with my invention, is particularly effective in developing resistance to aging and resistance to fatigue when they are used in conjunction with sulfur-bearing accelerators such as mercaptobenzothiazole, benzothiazyldisulfide, tetramethylthiuramdisulfide, zinc dimethyldithiocarbamate and the condensation product of mercaptobenzothiazole, benzyl chloride, and hexamethylenetetramine.

My invention is of special value in connection with compounds of low sulfur:rubber ratio, that is compounds in which the ratio of sulfur to rubber does not substantially exceed 2.5% by weight, compounds in which the ratio of sulfur to rubber approximates 1% by weight, for example. In this aspect, my invention enables the manufacturer of rubber goods to use compounds of low sulfur:rubber ratio, thus to derive the advantages of such compounds, in many products in which the ordinary compound of low sulfur:rubber ratio has been useless, for practical purposes, because of low fatigue resistance. In general, the resistance to aging improves as the sulfur:rubber ratio decreases down to the lowest point at which, with appropriate accelerators, effective vulcanization can be had. The fatigue resistance of ordinary compounds in which the sulfur:rubber ratio is much less than about 2.5%, however, is usually markedly less than that of similar compounds in which the sulfur:rubber ratio approximates 2.5-3.5%. My invention makes it possible to develop both resistance to aging and resistance to fatigue to a high degree in compounds including not more than about 2.5% by weight of sulfur on the rubber, even in compounds including not more than about 1% by weight of sulfur on the rubber. My invention includes these products produced by vulcanization of compounds of low sulfur:rubber ratio having high fatigue resistance and the process of making them. My invention is, however, useful in connection with compounds including as much as 4-5% by weight of sulfur on the rubber or more.

My invention is of special value in connection with compounds including substantial proportions of carbon black. One of the properties which carbon black imparts to rubber compounds in which it is included is resistance to abrasion. Improved resistance to abrasion can be developed by the use of carbon black in proportions approximating 45-60% by weight on the rubber, but for most purposes it has been considered necessary to limit the proportion of carbon black used to some maximum value in the general neighborhood of 45%. With my invention it is possible to increase the proportions of carbon black used in rubber compounds to as much as 60% by weight on the rubber without impairing, even with improvement of, the resistance of the compounds to fatigue. My invention includes these products produced by vulcanization of compounds containing substantial proportions of carbon black having high fatigue resistance and the process of making them.

Bases effective to activate the oxygen absorber include monoethanolamine, diethanolamine, triethanolamine, dibutylamine, tributylamine, diamylamine, dibenzylamine and aniline. Organic reducing agents may retard vulcanization, and, in compounds in which this effect is important, the use of an appropriate base in accordance with my invention may also operate to limit or to offset this effect.

For the production of products required to be of extremely long useful life, electrical insulation for example, vulcanizing agents such as selenium and tellurium are with advantage included in compounds of low sulfur:rubber ratio in the processes and products of my invention.

My invention will be further illustrated by the following examples including processes embodying my invention, processes producing products embodying my invention. The examples designated by number illustrate my invention. The examples designated by letter are given for purposes of comparison.

The following Compounds A to J inclusive and 1 to 5 inclusive were compounded in the usual manner, the reducing agent and the base, in Compounds 1 to 5, being incorporated as a previously prepared mixture of the two after incorporation of the other compounding materials.

Compound A consisted of

| | Parts (by weight) |
|---|---|
| Pale crepe | 100 |
| Zinc oxide | 100 |
| Whiting | 50 |
| Titanium dioxide | 20 |
| Stearic acid | 1 |
| Sulfur | 2.5 |
| Mercaptobenzothiazole (accelerator) | 0.75 |

Compounds B, C, D and E were the same as compound A except for substitution, respectively, of 0.125 part of tetramethylthiuramdisulfide, 0.6 part of the aldehyde-amine condensation product of aniline and butyraldehyde, 1.5 parts of the aldehydeamine condensation product of aniline, acetaldehyde and formaldehyde, and 0.5 part of the condensation product of mercaptobenzothiazole, benzyl chloride and hexamethylenetetramine as the accelerator in place of mercaptobenzothiazole.

Compounds F, G, H, I and J were the same, respectively, as Compounds A, B, C, D and E except for the inclusion in each of 0.75 part of phenylbetanaphthylamine (antioxidant).

Compounds 1, 2, 3, 4 and 5 were the same, respectively, as Compounds F, G, H, I and J except for the inclusion in each of 0.75 part of hydroquinone and 0.5 part of triethanolamine.

The usual test slabs, samples, and test pieces, samples, for determining resistance to fatigue in flexure, as hereinafter described, were vulcanized in a platen press at 141° C. for periods varying from 5 minutes to 90 minutes. Samples of Compounds A, B, C, D, E, F, H, J, and 1 and 5 were vulcanized for 10 minutes, 15 minutes, 30 minutes and 60 minutes. Samples of Compounds G and 2 were vulcanized for 5 minutes, 10 minutes, 15 minutes and 30 minutes. Samples of Compounds I and 3 and 4 were vulcanized for 15 minutes, 30 minutes, 60 minutes and 90 minutes.

In the following tabulations, values for physical properties for each compound are in the order of increasing periods of vulcanization. In these tabulations, the values for stress at 300% elongation, in pounds per square inch, appear under the caption (a), for tensile strength, in pounds per square inch, under the caption (b), and for the percentage elongation at break under the caption (c), and the values for fatigue resistance, determined as hereinafter described, after 2,000 complete cycles of flexure, after 5,000 cycles, after 10,000 cycles, after 20,000 cycles, after 30,000 cycles, after 50,000 cycles, after 100,000 cycles, after 150,000 cycles, after 200,000 cycles and after 300,000 cycles appear under the captions (d), (e), (f), (g), (h), (j), (k), (l), (m) and (n), respectively.

Fatigue resistance is conveniently measured in the DeMattia fatigue testing machine in accordance with conventional practice. For the purpose of measuring resistance to flex cracking on flexure, the test is conveniently carried out as follows, and the comparisons herein made with respect to flex cracking are based upon tests so carried out: Test pieces are molded as rectangular blocks 6″ x 1″ x ¼″ with an indentation transversely across one flat side of the piece at its center produced by the insertion, into the mold, of a half round steel bar of $\frac{3}{32}$″ radius. With the slides of the testing machine positioned 4 inches apart at maximum separation, the test pieces are clamped between them unstressed. The test pieces are then flexed, so as to stress the indented side of the test piece under tension, by operation of the testing machine. The test pieces, bent double through the indentation to expose the surface of the indentation, are periodically graded against a series of eleven samples, similarly bent, showing progressively deterioration from no flex cracks to complete rupture and marked in the same order 0, 1, 2, 3, 4, 5, 6, 7, 8, 9, 10. A test piece corresponding to the first standard is marked "0", the one corresponding to the fourth is marked "3", and so on. In the examples herein, the figures on fatigue resistance are given the grading of individual samples and as the summation of the gradings of 3 or 4 samples, the grading "10", "30" or "40", respectively, thus indicating complete rupture of the test piece or of all three or four test pieces and progressively lower gradings indicating progressively better resistance to fatigue in flexure.

*Compound A*

| (a) | (b) | (c) | (d) | (e) | (f) | (g) | (h) |
|---|---|---|---|---|---|---|---|
| 500 | 1940 | 620 | 1 | 1 | 2 | 8 | 10 |
| 605 | 2230 | 605 | 0 | 1 | 2 | 9 | 10 |
| 660 | 2240 | 590 | 0 | 2 | 5 | 10 | 10 |
| 635 | 2150 | 600 | 1 | 2 | 6 | 10 | 10 |
| Summation (4 tests)... | 2 | 6 | 15 | 37 | 40 | | |

*Compound B*

| (a) | (b) | (c) | (d) | (e) | (f) | (g) | (h) |
|---|---|---|---|---|---|---|---|
| 835 | 2610 | 570 | 0 | 0 | 0 | 2 | 3 |
| 780 | 2545 | 600 | 0 | 0 | 0 | 3 | 8 |
| 655 | 2370 | 620 | 1 | 2 | 7 | 10 | 10 |
| 550 | 2160 | 660 | 0 | 1 | 2 | 9 | 10 |
| Summation (4 tests)... | 1 | 3 | 9 | 24 | 31 | | |

*Compound C*

| (a) | (b) | (c) | (d) | (e) | (f) | (g) | (h) |
|---|---|---|---|---|---|---|---|
| 820 | 2840 | 595 | 0 | 0 | 1 | 4 | 9 |
| 910 | 3015 | 580 | 0 | 0 | 0 | 6 | 10 |
| 1005 | 2860 | 550 | 1 | 2 | 7 | 10 | 10 |
| 1065 | 2770 | 545 | 1 | 3 | 9 | 10 | 10 |
| Summation (4 tests)... | 2 | 5 | 17 | 30 | 39 | | |

*Compound D*

| (a) | (b) | (c) | (d) | (e) | (f) | (g) | (h) |
|---|---|---|---|---|---|---|---|
| 530 | 2030 | 615 | 0 | 2 | 8 | 10 | 10 |
| 640 | 2410 | 590 | 1 | 2 | 3 | 10 | 10 |
| 700 | 2770 | 595 | 1 | 3 | 8 | 10 | 10 |
| 855 | 2560 | 570 | 0 | 3 | 9 | 10 | 10 |
| Summation (4 tests)... | 2 | 10 | 28 | 40 | 40 | | |

*Compound E*

| (a) | (b) | (c) | (d) | (e) | (f) | (g) | (h) |
|---|---|---|---|---|---|---|---|
| 755 | 2620 | 610 | 0 | 0 | 1 | 4 | 9 |
| 885 | 2870 | 590 | 0 | 0 | 1 | 10 | 10 |
| 1010 | 2880 | 570 | 1 | 4 | 9 | 10 | 10 |
| 975 | 2715 | 560 | 1 | 3 | 9 | 10 | 10 |
| Summation (4 tests)... | 2 | 7 | 20 | 34 | 39 | | |

*Compound F*

| (a) | (b) | (c) | (d) | (e) | (f) | (g) | (h) |
|---|---|---|---|---|---|---|---|
| 635 | 2330 | 630 | 0 | 0 | 1 | 3 | 7 |
| 660 | 2540 | 615 | 1 | 1 | 1 | 2 | 5 |
| 740 | 2710 | 615 | 0 | 1 | 1 | 3 | 6 |
| 655 | 2370 | 620 | 0 | 1 | 1 | 1 | 2 |
| Summation (4 tests)... | 1 | 3 | 4 | 9 | 20 | | |

*Compound G*

| (a) | (b) | (c) | (d) | (e) | (f) | (g) | (h) |
|---|---|---|---|---|---|---|---|
| 875 | 2710 | 580 | 2 | 3 | 7 | 10 | 10 |
| 535 | 3040 | 630 | 0 | 0 | 1 | 8 | 10 |
| 825 | 2925 | 625 | 0 | 0 | 1 | 3 | 8 |
| 635 | 2420 | 640 | 1 | 1 | 1 | 1 | 2 |
| Summation (4 tests)... | 3 | 4 | 10 | 22 | 30 | | |

Compound H

| (a) | (b) | (c) | (d) | (e) | (f) | (g) | (h) |
|---|---|---|---|---|---|---|---|
| 810 | 2840 | 600 | 0 | 0 | 2 | 7 | 10 |
| 880 | 2950 | 590 | 0 | 1 | 1 | 4 | 9 |
| 920 | 2990 | 575 | 0 | 0 | 1 | 4 | 9 |
| 865 | 2670 | 560 | 0 | 0 | 0 | 2 | 6 |
| Summation (4 tests) | | | 0 | 1 | 4 | 17 | 34 |

Compound I

| (a) | (b) | (c) | (d) | (e) | (f) | (g) | (h) |
|---|---|---|---|---|---|---|---|
| 745 | 2420 | 580 | 0 | 0 | 1 | 2 | 6 |
| 840 | 2760 | 585 | 1 | 2 | 2 | 6 | 9 |
| 875 | 2920 | 590 | 0 | 0 | 2 | 6 | 9 |
| 835 | 2350 | 550 | 0 | 0 | 2 | 5 | 9 |
| Summation (4 tests) | | | 1 | 2 | 7 | 19 | 33 |

Compound J

| (a) | (b) | (c) | (d) | (e) | (f) | (g) | (h) |
|---|---|---|---|---|---|---|---|
| 710 | 2480 | 585 | 0 | 0 | 2 | 3 | 9 |
| 945 | 2870 | 580 | 1 | 1 | 2 | 6 | 9 |
| 995 | 2825 | 575 | 0 | 0 | 1 | 4 | 9 |
| 860 | 2720 | 595 | 0 | 0 | 1 | 2 | 5 |
| Summation (4 tests) | | | 1 | 1 | 6 | 15 | 31 |

Compound 1

| (a) | (b) | (c) | (d) | (e) | (f) | (g) | (h) |
|---|---|---|---|---|---|---|---|
| 1045 | 3000 | 570 | 0 | 0 | 1 | 2 | 7 |
| 1050 | 3025 | 570 | 0 | 0 | 0 | 2 | 4 |
| 1035 | 2840 | 560 | 0 | 0 | 0 | 2 | 4 |
| 850 | 2630 | 590 | 0 | 0 | 0 | 0 | 2 |
| Summation (4 tests) | | | 0 | 0 | 1 | 6 | 17 |

Compound 2

| (a) | (b) | (c) | (d) | (e) | (f) | (g) | (h) |
|---|---|---|---|---|---|---|---|
| 960 | 3210 | 590 | 0 | 1 | 2 | 8 | 9 |
| 930 | 2910 | 585 | 0 | 0 | 0 | 3 | 8 |
| 950 | 2840 | 570 | 0 | 0 | 1 | 3 | 5 |
| 855 | 2860 | 600 | 0 | 0 | 0 | 1 | 2 |
| Summation (4 tests) | | | 0 | 1 | 3 | 15 | 24 |

Compound 3

| (a) | (b) | (c) | (d) | (e) | (f) | (g) | (h) |
|---|---|---|---|---|---|---|---|
| 705 | 2500 | 600 | 0 | 0 | 1 | 2 | 7 |
| 900 | 2900 | 585 | 0 | 0 | 1 | 6 | 9 |
| 965 | 2980 | 580 | 0 | 0 | 2 | 8 | 9 |
| 815 | 2365 | 560 | 0 | 0 | 2 | 7 | 9 |
| Summation (4 tests) | | | 0 | 0 | 6 | 23 | 34 |

Compound 4

| (a) | (b) | (c) | (d) | (e) | (f) | (g) | (h) |
|---|---|---|---|---|---|---|---|
| 640 | 2140 | 585 | 0 | 0 | 0 | 1 | 3 |
| 790 | 2510 | 575 | 0 | 0 | 0 | 3 | 7 |
| 895 | 2620 | 565 | 0 | 0 | 2 | 6 | 9 |
| 765 | 2220 | 570 | 0 | 0 | 1 | 3 | 7 |
| Summation (4 tests) | | | 0 | 0 | 3 | 13 | 26 |

Compound 5

| (a) | (b) | (c) | (d) | (e) | (f) | (g) | (h) |
|---|---|---|---|---|---|---|---|
| 900 | 2780 | 570 | 0 | 0 | 1 | 6 | 9 |
| 995 | 2950 | 570 | 0 | 0 | 1 | 3 | 8 |
| 1030 | 2850 | 565 | 0 | 0 | 1 | 3 | 8 |
| 890 | 2670 | 585 | 0 | 0 | 0 | 2 | 7 |
| Summation (4 tests) | | | 0 | 0 | 3 | 14 | 32 |

The following Compounds K and L and 6 to 30 inclusive were compounded in the usual manner, the reducing agent or the reducing agent and the base, in Compounds 6 to 30, being incorporated after incorporation of the other compounding materials.

Compound K consisted of

|  | Parts (by weight) |
|---|---|
| Smoked sheets | 100 |
| Carbon black | 45 |
| Pine tar | 2 |
| Zinc oxide | 5 |
| Stearic acid | 4 |
| Sulfur | 3 |
| Mercaptobenzothiazole | 1 |

Compound L consisted of

|  | Parts (by weight) |
|---|---|
| Smoked sheets | 100 |
| Carbon black | 45 |
| Pine tar | 2 |
| Zinc oxide | 5 |
| Stearic acid | 4 |
| Sulfur | 3 |
| Mercaptobenzothiazole | 1 |
| Phenylbetanaphthylamine (antioxidant) | 1 |

Compound 6 was the same as Compound L except for the inclusion of 1 part of hydroquinone and 1 part of triethanolamine, and Compound 7 the same except for the inclusion of 1 part of pyrogallol and 1 part of triethanolamine.

Compound 8 was the same as Compound L except for the inclusion of 1 part of pyrogallol and 0.78 part of diethanolamine.

Compound 8 consisted of

|  | Parts (by weight) |
|---|---|
| Smoked sheets | 100 |
| Carbon black | 45 |
| Pine tar | 2 |
| Zinc oxide | 5 |
| Stearic acid | 4 |
| Sulfur | 3 |
| Mercaptobenzothiazole | 1 |
| Phenylbetanaphthylamine | 1 |
| Pyrogallol | 1 |
| Diethanolamine (base) | 0.78 |

Compounds 9, 10, 11, 12, 13 and 14 were the same as Compound 8 except for the substitution, respectively, of 0.45 part of monoethanolamine, 1.37 parts of tributylamine, 0.96 part of dibutylamine, 1.16 parts of diamylamine, 1.46 parts of dibenzylamine and 0.69 part of aniline as the base in place of diethanolamine.

Compound 15 was the same as Compound L except for the inclusion of 1 part of catechol and 1 part of triethanolamine.

Compound 15 consisted of

| | Parts (by weight) |
|---|---|
| Smoked sheets | 100 |
| Carbon black | 45 |
| Pine tar | 2 |
| Zinc oxide | 5 |
| Stearic acid | 4 |
| Sulfur | 3 |
| Mercaptobenzothiazole | 1 |
| Phenylbetanaphthylamine | 1 |
| Triethanolamine | 1 |
| Catechol (reducing agent) | 1 |

Compounds 16, 17, 18, 19, 20, 21, 22, 23, 24, 25, 26, 27, 28, 29 and 30 were the same as Compound 15 except for the substitution, respectively, of 1 part of chlorohydroquinone, 1 part of dichlorohydroquinone, 1 part of bromohydroquinone, 1 part of diamylhydroquinone, 1 part of para-aminophenol hydrochloride, 1 part of ortho-aminophenol hydrochloride, 1 part of para-hydroxyphenylglycine, 1 part of aminohydroxytoluene sulfate, 1 part of para-methylamino-phenol sulfate, 1 part of para-aminophenol oxalate, 1 part of para-dimethylaminophenol oxalate, 1 part of ortho-methylaminophenol sulfate, 1 part of diaminophenol hydrochloride, 1 part of para-benzylaminophenol hydrochloride and 1 part of para-phenylenediamine hydrochloride as the reducing agent in place of catechol.

The usual test slabs and test pieces for determining resistance to fatigue in flexure, as hereinbefore described, were vulcanized in a platen press at 135° C. for periods varying from 10 minutes to 120 minutes. Samples of Compounds K and 14 were vulcanized for 45 minutes, 60 minutes, 90 minutes and 120 minutes. Samples of Compounds L and 9 were vulcanized for 30 minutes, 45 minutes, 60 minutes and 120 minutes. Samples of Compounds 6, 7, 9, 11, 12 and 15 to 30 inclusive were vulcanized for 10 minutes, 15 minutes, 30 minutes and 60 minutes. Samples of compounds 8, 10, and 13 were vulcanized for 15 minutes, 30 minutes, 45 minutes and 90 minutes.

*Compound K*

| (a) | (b) | (c) | (j) | (k) | (l) |
|---|---|---|---|---|---|
| 1365 | 4170 | 590 | 3 | 7 | 8 |
| 1590 | 4140 | 550 | 3 | 7 | 9 |
| 1880 | 4110 | 500 | 8 | 9 | 9 |
| 1985 | 3880 | 465 | 9 | 10 | 10 |
| Summation (4 tests) | | | 23 | 33 | 36 |

*Compound L*

| (a) | (b) | (c) | (j) | (k) | (l) |
|---|---|---|---|---|---|
| 1120 | 4380 | 640 | 1 | 5 | 7 |
| 1470 | 4570 | 595 | 1 | 4 | 5 |
| 1655 | 4560 | 550 | 1 | 3 | 4 |
| 2050 | 4560 | 505 | 2 | 5 | 10 |
| Summation (4 tests) | | | 5 | 17 | 26 |

*Compound 6*

| (a) | (b) | (c) | (j) | (k) | (l) |
|---|---|---|---|---|---|
| 1750 | 5260 | 605 | 0 | 1 | 3 |
| 1870 | 5280 | 595 | 0 | 1 | 2 |
| 2230 | 5010 | 530 | 4 | 9 | 10 |
| 2400 | 4620 | 490 | 4 | 9 | 10 |
| Summation (4 tests) | | | 8 | 20 | 25 |

*Compound 7*

| (a) | (b) | (c) | (j) | (k) | (l) |
|---|---|---|---|---|---|
| 1065 | 3890 | 590 | 0 | 1 | 1 |
| 1310 | 4090 | 575 | 0 | 0 | 1 |
| 1555 | 4790 | 590 | 0 | 1 | 10 |
| 1690 | 4590 | 565 | 0 | 10 | 10 |
| Summation (4 tests) | | | 0 | 12 | 22 |

*Compound 8*

| (a) | (b) | (c) | (j) | (k) | (l) |
|---|---|---|---|---|---|
| 1255 | 3815 | 580 | 2 | 2 | 2 |
| 1485 | 4130 | 560 | 0 | 2 | 3 |
| 1715 | 4480 | 560 | 1 | 1 | 2 |
| 1760 | 3730 | 500 | 1 | 2 | 3 |
| Summation (4 tests) | | | 4 | 7 | 10 |

*Compound 9*

| (a) | (b) | (c) | (j) | (k) | (l) |
|---|---|---|---|---|---|
| 1130 | 3700 | 595 | 2 | 3 | 3 |
| 1360 | 4060 | 590 | 0 | 0 | 2 |
| 1500 | 4000 | 565 | 1 | 1 | 3 |
| 1580 | 3700 | 520 | 0 | 1 | 1 |
| Summation (4 tests) | | | 3 | 5 | 9 |

*Compound 10*

| (a) | (b) | (c) | (j) | (k) | (l) |
|---|---|---|---|---|---|
| 1440 | 4550 | 630 | 1 | 2 | 4 |
| 1600 | 4600 | 600 | 1 | 2 | 3 |
| 1850 | 4740 | 585 | 0 | 0 | 2 |
| 1780 | 4300 | 555 | 1 | 2 | 3 |
| Summation (4 tests) | | | 3 | 6 | 12 |

*Compound 11*

| (a) | (b) | (c) | (j) | (k) | (l) |
|---|---|---|---|---|---|
| 1220 | 4540 | 645 | 2 | 3 | 4 |
| 1620 | 4790 | 610 | 1 | 3 | 4 |
| 1910 | 4900 | 580 | 1 | 1 | 3 |
| 2060 | 4650 | 535 | 0 | 0 | 3 |
| Summation (4 tests) | | | 4 | 7 | 14 |

*Compound 12*

| (a) | (b) | (c) | (j) | (k) | (l) |
|---|---|---|---|---|---|
| 1100 | 3950 | 645 | 1 | 2 | 4 |
| 1430 | 4500 | 620 | 1 | 3 | 4 |
| 1760 | 4780 | 600 | 1 | 1 | 3 |
| 1920 | 4600 | 560 | 0 | 1 | 3 |
| Summation (4 tests) | | | 3 | 7 | 14 |

*Compound 13*

| (a) | (b) | (c) | (j) | (k) | (l) |
|---|---|---|---|---|---|
| 1070 | 3800 | 615 | 1 | 2 | 3 |
| 1310 | 4440 | 625 | 1 | 2 | 3 |
| 1480 | 4500 | 610 | 0 | 1 | 2 |
| 1600 | 4210 | 580 | 0 | 1 | 2 |
| Summation (4 tests) | | | 2 | 6 | 10 |

Compound 14

| (a) | (b) | (c) | (j) | (k) | (l) |
|---|---|---|---|---|---|
| 1150 | 3700 | 595 | 1 | 1 | 2 |
| 1340 | 4260 | 610 | 1 | 2 | 3 |
| 1510 | 4300 | 585 | 0 | 1 | 2 |
| 1575 | 4180 | 575 | 0 | 0 | 2 |
| Summation (4 tests)... | | | 2 | 4 | 9 |

Compound 15

| (a) | (b) | (c) | (j) | (k) | (l) |
|---|---|---|---|---|---|
| 1510 | 5130 | 650 | 0 | 1 | 3 |
| 1720 | 5180 | 615 | 0 | 1 | 1 |
| 2070 | 4990 | 560 | 0 | 4 | 10 |
| 2190 | 4650 | 510 | 1 | 8 | 10 |
| Summation (4 tests)... | | | 1 | 14 | 24 |

Compound 16

| (a) | (b) | (c) | (j) | (k) | (l) |
|---|---|---|---|---|---|
| 1675 | 4920 | 600 | 0 | 1 | 3 |
| 1860 | 5160 | 580 | 0 | 1 | 2 |
| 2270 | 4920 | 520 | 2 | 9 | 10 |
| 2430 | 4660 | 475 | 4 | 10 | 10 |
| Summation (4 tests)... | | | 6 | 21 | 25 |

Compound 17

| (a) | (b) | (c) | (j) | (k) | (l) |
|---|---|---|---|---|---|
| 1590 | 5120 | 620 | 0 | 0 | 1 |
| 1810 | 5100 | 585 | 0 | 0 | 1 |
| 2210 | 4950 | 525 | 0 | 5 | 10 |
| 2330 | 4580 | 475 | 2 | 10 | 10 |
| Summation (4 tests)... | | | 2 | 15 | 22 |

Compound 18

| (a) | (b) | (c) | (j) | (k) | (l) |
|---|---|---|---|---|---|
| 1685 | 5150 | 620 | 0 | 0 | 1 |
| 1845 | 5220 | 600 | 0 | 0 | 1 |
| 2190 | 4970 | 530 | 0 | 5 | 10 |
| 2350 | 4690 | 465 | 2 | 10 | 10 |
| Summation (4 tests)... | | | 2 | 15 | 22 |

Compound 19

| (a) | (b) | (c) | (j) | (k) | (l) |
|---|---|---|---|---|---|
| 1550 | 5040 | 610 | 0 | 1 | 1 |
| 1730 | 4750 | 560 | 0 | 0 | 1 |
| 2100 | 4550 | 500 | 0 | 6 | 9 |
| 2200 | 4420 | 465 | 8 | 9 | 9 |
| Summation (4 tests)... | | | 8 | 16 | 20 |

Compound 20

| (a) | (b) | (c) | (j) | (k) | (l) |
|---|---|---|---|---|---|
| 1520 | 4940 | 625 | 0 | 2 | 3 |
| 1775 | 4930 | 580 | 0 | 1 | 2 |
| 2040 | 4760 | 530 | 0 | 4 | 9 |
| 2160 | 4500 | 500 | 2 | 9 | 9 |
| Summation (4 tests).. | | | 2 | 16 | 23 |

Compound 21

| (a) | (b) | (c) | (j) | (k) | (l) |
|---|---|---|---|---|---|
| 1495 | 5020 | 630 | 0 | 2 | 2 |
| 1740 | 4950 | 600 | 0 | 0 | 1 |
| 2170 | 4790 | 625 | 0 | 6 | 9 |
| 2270 | 4520 | 490 | 2 | 9 | 9 |
| Summation (4 tests)... | | | 2 | 17 | 21 |

Compound 22

| (a) | (b) | (c) | (j) | (k) | (l) |
|---|---|---|---|---|---|
| 1495 | 4940 | 620 | 0 | 1 | 2 |
| 1710 | 4950 | 590 | 0 | 0 | 2 |
| 2050 | 4690 | 520 | 0 | 7 | 10 |
| 2130 | 4110 | 460 | 9 | 10 | 10 |
| Summation (4 tests)... | | | 9 | 18 | 24 |

Compound 23

| (a) | (b) | (c) | (j) | (k) | (l) |
|---|---|---|---|---|---|
| 1460 | 4910 | 625 | 0 | 1 | 2 |
| 1685 | 4860 | 585 | 0 | 1 | 1 |
| 1960 | 4710 | 535 | 0 | 7 | 10 |
| 2140 | 4410 | 490 | 1 | 9 | 9 |
| Summation (4 tests)... | | | 1 | 18 | 22 |

Compound 24

| (a) | (b) | (c) | (j) | (k) | (l) |
|---|---|---|---|---|---|
| 1525 | 4940 | 625 | 0 | 0 | 2 |
| 1690 | 4920 | 595 | 0 | 0 | 2 |
| 2020 | 4720 | 535 | 0 | 7 | 8 |
| 2110 | 4560 | 515 | 1 | 9 | 9 |
| Summation (4 tests)... | | | 1 | 16 | 21 |

Compound 25

| (a) | (b) | (c) | (j) | (k) | (l) |
|---|---|---|---|---|---|
| 1500 | 5010 | 620 | 2 | 2 | 4 |
| 1760 | 5110 | 590 | 0 | 1 | 2 |
| 2080 | 4850 | 530 | 1 | 2 | 2 |
| 2170 | 4680 | 510 | 1 | 9 | 10 |
| Summation (4 tests)... | | | 4 | 14 | 18 |

Compound 26

| (a) | (b) | (c) | (j) | (k) | (l) |
|---|---|---|---|---|---|
| 1400 | 4940 | 640 | 1 | 2 | 3 |
| 1670 | 4920 | 590 | 0 | 1 | 2 |
| 2020 | 4900 | 550 | 1 | 1 | 5 |
| 2120 | 4550 | 530 | 1 | 8 | 10 |
| Summation (4 tests)... | | | 3 | 12 | 20 |

Compound 27

| (a) | (b) | (c) | (j) | (k) | (l) |
|---|---|---|---|---|---|
| 1400 | 5000 | 660 | 2 | 2 | 4 |
| 1730 | 4980 | 580 | 1 | 1 | 3 |
| 2080 | 4850 | 530 | 0 | 3 | 10 |
| 2300 | 4300 | 480 | 1 | 9 | 10 |
| Summation (4 tests)... | | | 4 | 15 | 27 |

*Compound 28*

| (a) | (b) | (c) | (j) | (k) | (l) |
|---|---|---|---|---|---|
| 1430 | 4940 | 630 | 2 | 2 | 3 |
| 1730 | 4920 | 590 | 2 | 2 | 4 |
| 1960 | 4840 | 540 | 2 | 2 | 6 |
| 2200 | 4550 | 500 | 2 | 9 | 10 |
| Summation (4 tests) | | | 8 | 15 | 23 |

*Compound 29*

| (a) | (b) | (c) | (j) | (k) | (l) |
|---|---|---|---|---|---|
| 1500 | 5020 | 650 | 0 | 1 | 2 |
| 1730 | 5100 | 620 | 0 | 1 | 2 |
| 2060 | 5000 | 550 | 0 | 9 | 10 |
| 2180 | 4680 | 510 | 5 | 9 | 10 |
| Summation (4 tests) | | | 5 | 20 | 24 |

*Compound 30*

| (a) | (b) | (c) | (j) | (k) | (l) |
|---|---|---|---|---|---|
| 1590 | 4860 | 620 | 0 | 2 | 4 |
| 1850 | 5000 | 590 | 1 | 1 | 3 |
| 2130 | 4560 | 520 | 1 | 2 | 6 |
| 2320 | 4450 | 470 | 3 | 9 | 10 |
| Summation (4 tests) | | | 5 | 14 | 23 |

The following Compounds M and 31 and 32 inclusive were compounded in the usual manner, the reducing agent or the reducing agent and the base, in Compounds 31 and 32, being incorporated after incorporation of the other compounding materials.

Compound M consisted of

| | Parts (by weight) |
|---|---|
| Pale crepe | 100 |
| Zinc oxide | 100 |
| Whiting | 50 |
| Titanium dioxide | 20 |
| Stearic acid | 1 |
| Sulfur | 0.5 |
| Mercaptobenzothiazole | 1 |
| Tetramethylthiuram disulfide | 0.2 |
| Phenylbetanaphthylamine | 1 |

Compounds 31 and 32 were the same as Compound M except for the inclusion of 0.75 part of pyrogallol and 0.5 part of triethanolamine in Compound 31, and the inclusion of 0.75 part of hydroquinone and 0.5 part of triethanolamine in Compound 32.

The usual test slabs and test pieces for determining resistance to fatigue in flexure, as hereinbefore described, were vulcanized in a platen press at 135° C. for periods varying from 10 minutes to 120 minutes. Samples of Compounds 31 and 32 were vulcanized for 10 minutes, 15 minutes, 30 minutes and 60 minutes.

*Compound M*

| (a) | (b) | (c) | (d) | (e) | (f) | (g) |
|---|---|---|---|---|---|---|
| 650 | 2260 | 595 | 0 | 0 | 2 | 8 |
| 720 | 2410 | 590 | 0 | 1 | 3 | 9 |
| 745 | 2450 | 575 | 2 | 2 | 6 | 9 |
| 765 | 2450 | 580 | 0 | 2 | 6 | 9 |
| Summation (4 tests) | | | 2 | 5 | 17 | 35 |

*Compound 31*

| (a) | (b) | (c) | (d) | (e) | (f) | (g) |
|---|---|---|---|---|---|---|
| 735 | 2260 | 580 | 0 | 0 | 0 | 3 |
| 800 | 2390 | 570 | 0 | 0 | 0 | 2 |
| 830 | 2350 | 570 | 0 | 1 | 2 | 4 |
| 925 | 2490 | 565 | 0 | 1 | 2 | 4 |
| Summation (4 tests) | | | 0 | 2 | 4 | 13 |

*Compound 32*

| (a) | (b) | (c) | (d) | (e) | (f) | (g) |
|---|---|---|---|---|---|---|
| 805 | 2730 | 585 | 0 | 0 | 2 | 7 |
| 800 | 2660 | 585 | 0 | 0 | 0 | 2 |
| 800 | 2570 | 580 | 0 | 0 | 0 | 4 |
| 770 | 2640 | 600 | 0 | 0 | 0 | 2 |
| Summation (4 tests) | | | 0 | 0 | 2 | 15 |

The following Compounds N and 33 to 50 inclusive were compounded in the usual manner, the reducing agent and the base being incorporated after incorporation of the other compounding materials.

Compound N consisted of

| | Parts (by weight) |
|---|---|
| Smoked sheets | 100 |
| Carbon black | 45 |
| Pine tar | 2 |
| Zinc oxide | 5 |
| Stearic acid | 4 |
| Selenium | 0.1 |
| Sulfur | 1 |
| Mercaptobenzothiazole | 1 |
| Tetramethylthiuram disulfide | 0.15 |
| Phenylbetanaphthylamine | 1 |

Compounds 33 to 50 inclusive were the same as Compound N except for the inclusion of 1 part of hydroquinone and 1 part of triethanolamine in Compound 33, the inclusion of 1 part of pyrogallol and 1 part of triethanolamine in Compound 34, the inclusion of 1 part of catechol and 1 part of triethanolamine in Compound 35, the inclusion of 1 part of chlorohydroquinone and 1 part of triethanolamine in Compound 36, the inclusion of 1 part of dichlorohydroquinone and 1 part of triethanolamine in Compound 37, the inclusion of 1 part of bromohydroquinone and 1 part of triethanolamine in Compound 38, the inclusion of 1 part of diamylhydroquinone and 1 part of triethanolamine in Compound 39, the inclusion of 1 part of para-aminophenol hydrochloride and 1 part of triethanolamine in Compound 40, the inclusion of 1 part of ortho-aminophenol hydrochloride and 1 part of triethanolamine in Compound 41, the inclusion of 1 part of para-hydroxyphenylglycine and 1 part of triethanolamine in Compound 42, the inclusion of 1 part of aminohydroxytoluene sulfate and 1 part of triethanolamine in Compound 43, the inclusion of 1 part of para-methylaminophenol sulfate and 1 part of triethanolamine in Compound 44, the inclusion of 1 part of para-aminophenol oxalate and 1 part of triethanolamine in Compound 45, the inclusion of 1 part of para-dimethylaminophenol oxalate and 1 part of triethanolamine in Compound 46, the inclusion of 1 part of ortho-methylaminophenol sulfate and 1 part of triethanolamine in Compound 47, the inclusion of 1 part of diaminophenol hydrochloride and 1 part of triethanolamine in Compound 48, the inclusion of 1 part of para-benzylaminophenol hydrochloride and 1 part of triethanolamine in Compound 49 and the inclusion of 1 part of para-phenylenediamine hydrochloride and 1 part of triethanolamine in Compound 50.

The usual test slabs and test pieces for determining resistance to fatigue in flexure, as hereinbefore described, were vulcanized in a platen press at 135° C. for periods varying from 10 to 120 minutes. Samples of Compound N were vulcanized for 30 minutes, 45 minutes, 60 minutes and 120 minutes. Samples of Compounds 33, 34, 35, 36, 37, 38, 39, 40, 41, 42, 43, 44, 45, 46, 47, 48, 49 and 50 were vulcanized for 10 minutes, 15 minutes, 30 minutes and 60 minutes.

*Compound N*

| (a) | (b) | (c) | (j) | (k) | (l) |
|---|---|---|---|---|---|
| 1030 | 4530 | 675 | 2 | 8 | 10 |
| 1235 | 4660 | 630 | 2 | 7 | 10 |
| 1515 | 4670 | 585 | 2 | 5 | 9 |
| 1780 | 4660 | 540 | 2 | 7 | 9 |
| Summation (4 tests) | | | 8 | 27 | 38 |

*Compound 33*

| (a) | (b) | (c) | (j) | (k) | (l) |
|---|---|---|---|---|---|
| 1510 | 5320 | 625 | 1 | 5 | 8 |
| 1645 | 5240 | 610 | 1 | 3 | 4 |
| 1760 | 5130 | 580 | 2 | 3 | 7 |
| 1790 | 5080 | 565 | 2 | 6 | 8 |
| Summation (4 tests) | | | 6 | 17 | 27 |

*Compound 34*

| (a) | (b) | (c) | (j) | (k) | (l) |
|---|---|---|---|---|---|
| 1080 | 4440 | 630 | 1 | 3 | 5 |
| 1295 | 4720 | 610 | 0 | 1 | 3 |
| 1575 | 5120 | 600 | 1 | 2 | 4 |
| 1610 | 5310 | 605 | 1 | 3 | 6 |
| Summation (4 tests) | | | 3 | 9 | 18 |

*Compound 35*

| (a) | (b) | (c) | (j) | (k) | (l) |
|---|---|---|---|---|---|
| 1345 | 5080 | 650 | 1 | 3 | 5 |
| 1470 | 5140 | 625 | 0 | 2 | 4 |
| 1685 | 5140 | 600 | 0 | 2 | 4 |
| 1815 | 5210 | 570 | 2 | 3 | 6 |
| Summation (4 tests) | | | 3 | 10 | 19 |

*Compound 36*

| (a) | (b) | (c) | (j) | (k) | (l) |
|---|---|---|---|---|---|
| 1510 | 5380 | 650 | 1 | 3 | 4 |
| 1580 | 5750 | 610 | 0 | 2 | 3 |
| 1755 | 5260 | 590 | 2 | 4 | 8 |
| 1845 | 5320 | 575 | 1 | 3 | 5 |
| Summation (4 tests) | | | 4 | 12 | 20 |

*Compound 37*

| (a) | (b) | (c) | (j) | (k) | (l) |
|---|---|---|---|---|---|
| 1370 | 5220 | 655 | 1 | 5 | 8 |
| 1580 | 5160 | 615 | 0 | 2 | 5 |
| 1705 | 5200 | 585 | 1 | 3 | 6 |
| 1960 | 5790 | 555 | 2 | 6 | 9 |
| Summation (4 tests) | | | 4 | 16 | 28 |

*Compound 38*

| (a) | (b) | (c) | (j) | (k) | (l) |
|---|---|---|---|---|---|
| 1480 | 5290 | 645 | 1 | 4 | 7 |
| 1520 | 5350 | 630 | 1 | 1 | 4 |
| 1765 | 5320 | 590 | 1 | 4 | 5 |
| 1840 | 5070 | 550 | 2 | 5 | 8 |
| Summation (4 tests) | | | 5 | 14 | 24 |

*Compound 39*

| (a) | (b) | (c) | (j) | (k) | (l) |
|---|---|---|---|---|---|
| 1550 | 5210 | 610 | 1 | 3 | 6 |
| 1630 | 5160 | 585 | 1 | 3 | 6 |
| 1785 | 5600 | 570 | 1 | 3 | 7 |
| 1870 | 4790 | 525 | 1 | 4 | 9 |
| Summation (4 tests) | | | 4 | 13 | 28 |

*Compound 40*

| (a) | (b) | (c) | (j) | (k) | (l) |
|---|---|---|---|---|---|
| 1430 | 5150 | 630 | 0 | 2 | 4 |
| 1540 | 5160 | 610 | 1 | 2 | 4 |
| 1715 | 5350 | 575 | 1 | 2 | 7 |
| 1835 | 5090 | 560 | 1 | 2 | 4 |
| Summation (4 tests) | | | 3 | 8 | 19 |

*Compound 41*

| (a) | (b) | (c) | (j) | (k) | (l) |
|---|---|---|---|---|---|
| 1360 | 5180 | 615 | 1 | 3 | 5 |
| 1460 | 5160 | 610 | 1 | 2 | 5 |
| 1610 | 5220 | 570 | 1 | 3 | 7 |
| 1680 | 5120 | 565 | 2 | 3 | 7 |
| Summation (4 tests) | | | 5 | 11 | 24 |

*Compound 42*

| (a) | (b) | (c) | (j) | (k) | (l) |
|---|---|---|---|---|---|
| 1470 | 5250 | 625 | 0 | 4 | 8 |
| 1560 | 5380 | 595 | 1 | 4 | 8 |
| 1715 | 5170 | 570 | 1 | 3 | 8 |
| 1725 | 5260 | 570 | 2 | 6 | 9 |
| Summation (4 tests) | | | 4 | 17 | 33 |

*Compound 43*

| (a) | (b) | (c) | (j) | (k) | (l) |
|---|---|---|---|---|---|
| 1460 | 5360 | 645 | 1 | 4 | 7 |
| 1530 | 5490 | 635 | 1 | 4 | 7 |
| 1660 | 5260 | 590 | 2 | 4 | 8 |
| 1820 | 5340 | 575 | 2 | 5 | 8 |
| Summation (4 tests) | | | 6 | 17 | 30 |

*Compound 44*

| (a) | (b) | (c) | (j) | (k) | (l) |
|---|---|---|---|---|---|
| 1430 | 5130 | 620 | 1 | 3 | 6 |
| 1495 | 5210 | 610 | 1 | 3 | 6 |
| 1710 | 5400 | 575 | 1 | 3 | 5 |
| 1840 | 5360 | 570 | 1 | 3 | 8 |
| Summation (4 tests) | | | 4 | 12 | 25 |

*Compound 45*

| (a) | (b) | (c) | (j) | (k) | (l) |
|---|---|---|---|---|---|
| 1430 | 5260 | 615 | 1 | 2 | 4 |
| 1610 | 5300 | 585 | 1 | 4 | 7 |
| 1780 | 5370 | 575 | 2 | 4 | 8 |
| 1790 | 5220 | 555 | 2 | 4 | 9 |
| Summation (4 tests) | | | 6 | 14 | 28 |

*Compound 46*

| (a) | (b) | (c) | (j) | (k) | (l) |
|---|---|---|---|---|---|
| 1420 | 5360 | 640 | 1 | 2 | 4 |
| 1560 | 5360 | 615 | 0 | 0 | 0 |
| 1760 | 5420 | 600 | 2 | 3 | 6 |
| 1805 | 5140 | 565 | 2 | 4 | 8 |
| Summation (4 tests) | | | 5 | 9 | 18 |

*Compound 47*

| (a) | (b) | (c) | (j) | (k) | (l) |
|---|---|---|---|---|---|
| 1325 | 5260 | 655 | 1 | 3 | 5 |
| 1470 | 5240 | 620 | 1 | 2 | 4 |
| 1735 | 5240 | 590 | 2 | 5 | 8 |
| 1730 | 5060 | 570 | 2 | 4 | 7 |
| Summation (4 tests) | | | 6 | 14 | 24 |

*Compound 48*

| (a) | (b) | (c) | (j) | (k) | (l) |
|---|---|---|---|---|---|
| 1320 | 5060 | 625 | 1 | 3 | 4 |
| 1610 | 5110 | 620 | 1 | 3 | 7 |
| 1760 | 5140 | 560 | 1 | 3 | 6 |
| 1830 | 4910 | 535 | 1 | 3 | 4 |
| Summation (4 tests) | | | 4 | 12 | 21 |

*Compound 49*

| (a) | (b) | (c) | (j) | (k) | (l) |
|---|---|---|---|---|---|
| 1395 | 5360 | 650 | 1 | 2 | 3 |
| 1555 | 5360 | 620 | 0 | 0 | 2 |
| 1615 | 5280 | 595 | 2 | 3 | 4 |
| 1765 | 5210 | 570 | 2 | 3 | 6 |
| Summation (4 tests) | | | 5 | 8 | 15 |

*Compound 50*

| (a) | (b) | (c) | (j) | (k) | (l) |
|---|---|---|---|---|---|
| 1470 | 5130 | 620 | 1 | 1 | 2 |
| 1680 | 5290 | 600 | 1 | 4 | 8 |
| 1805 | 5260 | 575 | 2 | 7 | 9 |
| 1885 | 4910 | 540 | 3 | 7 | 10 |
| Summation (4 tests) | | | 7 | 19 | 29 |

The following Compounds O and 51 to 55 inclusive were compounded in the usual manner, the reducing agent and the base being incorporated after incorporation of the other compounding materials.

Compound O consisted of

| | Parts (by weight) |
|---|---|
| Smoked sheets | 100 |
| Carbon black | 45 |
| Pine tar | 2 |
| Zinc oxide | 5 |
| Stearic acid | 4 |
| Sulfur | 3 |
| Mercaptobenzothiazole | 1 |
| Phenylbetanaphthylamine (antioxidant) | 5 |

Compounds 52, 53, 54 and 55 were the same as Compound O except for the inclusion of 0.75 part of pyrogallol and 0.5 part of triethanolamine in each of these compounds and for the substitution, respectively, of 5 parts of dibetanaphthyl-para-phenylenediamine, of 5 parts of the condensation product of acetone and diphenylamine, of 5 parts phenylalpha-naphthylamine and of 5 parts of ethylenedi-ortho-tolyldiamine as the antioxidant in place of phenylbetanaphthylamine. Compound 51 was the same as Compound O except for the inclusion of 0.75 part of pyrogallol and 0.5 part of triethanolamine.

The usual test slabs and test pieces for determining resistance to fatigue in flexure, as hereinbefore described, were vulcanized in a platen press at 135° C. for periods varying from 15 minutes to 120 minutes. Samples of Compounds O, and 51, 53, 54 and 55 were vulcanized for 30 minutes, 45 minutes, 60 minutes and 120 minutes. Samples of Compound 52 were vulcanized for 15 minutes, 30 minutes, 45 minutes and 90 minutes.

*Compound O*

| (a) | (b) | (c) | (j) | (k) | (l) | (m) | (n) |
|---|---|---|---|---|---|---|---|
| 1120 | 4320 | 695 | 1 | 2 | 3 | 4 | 8 |
| 1360 | 4500 | 645 | 0 | 1 | 2 | 2 | 5 |
| 1555 | 4620 | 620 | 0 | 2 | 2 | 3 | 5 |
| 1855 | 4280 | 550 | 0 | 0 | 4 | 8 | 10 |
| Summation (4 tests) | | | 1 | 5 | 11 | 17 | 28 |

*Compound 51*

| (a) | (b) | (c) | (j) | (k) | (l) | (m) | (n) |
|---|---|---|---|---|---|---|---|
| 1395 | 4610 | 640 | 0 | 0 | 1 | 2 | 3 |
| 1510 | 4650 | 620 | 0 | 0 | 1 | 2 | 3 |
| 1630 | 4430 | 580 | 0 | 0 | 1 | 1 | 2 |
| 1540 | 4160 | 575 | 0 | 0 | 1 | 1 | 3 |
| Summation (4 tests) | | | 0 | 0 | 4 | 6 | 11 |

*Compound 52*

| (a) | (b) | (c) | (j) | (k) | (l) | (m) | (n) |
|---|---|---|---|---|---|---|---|
| 1135 | 3870 | 610 | 1 | 3 | 6 | 7 | 9 |
| 1460 | 4260 | 600 | 1 | 3 | 6 | 7 | 9 |
| 1690 | 4470 | 590 | 1 | 4 | 7 | 8 | 10 |
| 1815 | 4150 | 550 | 2 | 5 | 7 | 8 | 10 |
| Summation (4 tests) | | | 5 | 15 | 26 | 30 | 38 |

*Compound 53*

| (a) | (b) | (c) | (j) | (k) | (l) | (m) | (n) |
|---|---|---|---|---|---|---|---|
| 1310 | 4530 | 670 | 0 | 0 | 1 | 1 | 2 |
| 1565 | 4810 | 650 | 0 | 0 | 1 | 1 | 2 |
| 1575 | 4740 | 635 | 0 | 0 | 1 | 1 | 2 |
| 1485 | 4400 | 600 | 0 | 0 | 1 | 1 | 2 |
| Summation (4 tests) | | | 0 | 0 | 4 | 4 | 8 |

*Compound 54*

| (a) | (b) | (c) | (j) | (k) | (l) | (m) | (n) |
|---|---|---|---|---|---|---|---|
| 1135 | 3000 | 625 | 0 | 1 | 1 | 2 | 4 |
| 1460 | 4330 | 610 | 0 | 1 | 1 | 2 | 4 |
| 1505 | 4580 | 605 | 0 | 0 | 1 | 2 | 4 |
| 1545 | 4030 | 500 | 0 | 0 | 1 | 1 | 2 |
| Summation (4 tests).... | | | 0 | 2 | 4 | 6 | 12 |

*Compound 55*

| (a) | (b) | (c) | (j) | (k) | (l) | (m) | (n) |
|---|---|---|---|---|---|---|---|
| 1315 | 4400 | 660 | 0 | 1 | 2 | 2 | 6 |
| 1505 | 4750 | 635 | 0 | 1 | 2 | 3 | 7 |
| 1510 | 4550 | 630 | 0 | 0 | 2 | 3 | 6 |
| 1535 | 4120 | 585 | 0 | 0 | 1 | 2 | 5 |
| Summation (4 tests).... | | | 0 | 2 | 7 | 10 | 24 |

The following Compounds P to S inclusive and 56 to 59 inclusive were compounded in the usual manner, the reducing agent and the base, in Compounds 56 to 59, being incorporated as a previously prepared mixture of the two after incorporation of the other compounding materials.

Compound P consisted of

| | Parts (by weight) |
|---|---|
| Smoked sheets | 100 |
| Carbon black | 50 |
| Pine tar | 2 |
| Zinc oxide | 5 |
| Stearic acid | 5 |
| Selenium | 0.15 |
| Sulfur | 1 |
| Mercaptobenzothiazole | 1 |
| Tetramethylthiuramdisulfide | 0.1 |
| A mixture of about 80% phenylbetanaphthylamine and 20% diphenyl-para-phenylenediamine | 1 |

Compound 56 was the same as Compound P except for the inclusion of 0.5 part of pyrogallol and 0.25 part of triethanolamine. Compound Q was the same as Compound P except for the substitution of 60 parts of carbon black and 6 parts of stearic acid, respectively, for the 50 parts of carbon black and 5 parts of stearic acid. Compound 57 was the same as Compound Q except for the inclusion of 0.5 part of pyrogallol and 0.25 part of triethanolamine.

Compound R consisted of

| | Parts (by weight) |
|---|---|
| Smoked sheets | 100 |
| Carbon black | 50 |
| Pine tar | 2 |
| Zinc oxide | 5 |
| Stearic acid | 5 |
| Sulfur | 3 |
| Mercaptobenzothiazole | 1 |
| A mixture of about 80% phenylbetanaphthylamine and 20% diphenyl-para-phenylene-diamine | 1 |

Compound 58 was the same as Compound R except for the inclusion of 0.5 part of pyrogallol and 0.25 part of triethanolamine. Compound S was the same as Compound R except for the substitution of 60 parts of carbon black and 6 parts of stearic acid, respectively, for the 50 parts of carbon black and 5 parts of stearic acid. Compound 59 was the same as Compound S except for the inclusion of 0.5 part of pyrogallol and 0.25 part of triethanolamine.

The usual test slabs and test pieces for determining resistance to fatigue in flexure, as hereinbefore described, were vulcanized in a platen press at 135° C. for 30 minutes, 45 minutes, 60 minutes and 120 minutes.

*Compound P*

| (a) | (b) | (c) | (j) | (k) | (l) |
|---|---|---|---|---|---|
| 1305 | 4190 | 650 | 2 | 7 | 9 |
| 1615 | 4760 | 610 | 1 | 3 | 8 |
| 1830 | 4790 | 585 | 2 | 5 | 9 |
| 2150 | 4660 | 525 | 3 | 5 | 9 |
| Summation (4 tests)... | | | 8 | 20 | 35 |

*Compound Q*

| (a) | (b) | (c) | (j) | (k) | (l) |
|---|---|---|---|---|---|
| 1475 | 3820 | 585 | 1 | 4 | 8 |
| 1960 | 4100 | 550 | 1 | 3 | 7 |
| 2190 | 4230 | 530 | 2 | 6 | 8 |
| 2630 | 4270 | 465 | 3 | 4 | 8 |
| Summation (4 tests)... | | | 7 | 17 | 31 |

*Compound R*

| (a) | (b) | (c) | (j) | (k) | (l) |
|---|---|---|---|---|---|
| 1560 | 4320 | 625 | 0 | 1 | 3 |
| 1890 | 4580 | 580 | 0 | 0 | 2 |
| 2030 | 4570 | 535 | 1 | 2 | 2 |
| 2430 | 4310 | 465 | 1 | 10 | 10 |
| Summation (4 tests)... | | | 2 | 13 | 17 |

*Compound S*

| (a) | (b) | (c) | (j) | (k) | (l) |
|---|---|---|---|---|---|
| 1885 | 4260 | 555 | 0 | 0 | 2 |
| 2380 | 4250 | 510 | 0 | 0 | 1 |
| 2570 | 4250 | 470 | 1 | 2 | 2 |
| 3130 | 4000 | 375 | 8 | 10 | 10 |
| Summation (4 tests)... | | | 9 | 12 | 15 |

*Compound 56*

| (a) | (b) | (c) | (j) | (k) | (l) |
|---|---|---|---|---|---|
| 1425 | 4720 | 645 | 1 | 2 | 6 |
| 1640 | 4920 | 620 | 1 | 2 | 4 |
| 1835 | 4790 | 610 | 2 | 3 | 6 |
| 1970 | 4820 | 555 | 2 | 3 | 6 |
| Summation (4 tests)... | | | 6 | 10 | 22 |

*Compound 57*

| (a) | (b) | (c) | (j) | (k) | (l) |
|---|---|---|---|---|---|
| 1945 | 4200 | 555 | 1 | 2 | 6 |
| 2230 | 4300 | 530 | 0 | 2 | 6 |
| 2380 | 4320 | 520 | 2 | 3 | 5 |
| 2610 | 4260 | 465 | 2 | 3 | 5 |
| Summation (4 tests)... | | | 5 | 10 | 22 |

*Compound 58*

| (a) | (b) | (c) | (j) | (k) | (l) |
|---|---|---|---|---|---|
| 1615 | 4280 | 610 | 0 | 0 | 2 |
| 1875 | 4570 | 585 | 0 | 0 | 1 |
| 2040 | 4430 | 545 | 2 | 2 | 2 |
| 2120 | 4210 | 510 | 1 | 2 | 4 |
| Summation (4 tests)... | | | 3 | 4 | 9 |

Compound 59

| (a) | (b) | (c) | (j) | (k) | (l) |
|---|---|---|---|---|---|
| 1870 | 4150 | 570 | 0 | 0 | 2 |
| 2250 | 4250 | 525 | 0 | 0 | 1 |
| 2380 | 4220 | 500 | 0 | 1 | 1 |
| 2660 | 3990 | 425 | 0 | 8 | 10 |
| Summation (4 tests) | | | 0 | 9 | 14 |

Although, in practicing the process of my invention, the rubber compounds, as compounded, are nominally dry, the catalytic antioxidants and the organic reducing agents being incorporated as such, the compounding is carried out in the usual manner, with no special precautions to exclude moisture from the atmosphere for example, making it probable that moisture is present to the extent to which it is usually encountered, in amounts of the order of 0.5% by weight on the compound for example.

My invention also includes rubber compounding compositions of special utility for carrying out the process of my invention. Catalytic antioxidants and organic reducing agents, of the class described, may with advantage be admixed to enable these two compounding agents, used jointly in the process of my invention, to be handled as a single compounding material in the preparation of the rubber compound to be vulcanized. Organic reducing agents and bases, of the classes described, may with advantage be admixed to enable these two compounding agents, used jointly in the process of my invention, to be handled as a single compounding material in the preparation of the rubber compound to be vulcanized, provided care is taken to exclude moisture from the mixture until it is incorporated into the rubber compound.

I have referred specifically to tire casings and electrical insulation of rubber as illustrations of products benefited by my invention. It will be apparent, however, that my invention is not limited in application to these two products. My invention is of general application in the development of improved fatigue resistance in vulcanized rubber products. My invention does, however, have special advantages in special applications. For example, my invention enables the production of tire casings of high fatigue resistance and containing high proportions of carbon black on the rubber to develop high resistance to abrasion, and again my invention enables the production of tire tubes of high fatigue resistance but in which marked improvement with respect to aging due to oxidation, an effect peculiarly marked in tire tubes because of the increased oxygen concentration incident to the inflation pressure and to the high temperatures attained within the tire and to which the tube is subjected particularly in heavy duty service, is developed by the use of compounds of low sulfur:rubber ratio. Rubber belts are another class of product in connection with which my invention is similarly of special value. In products formed of a number of plies, tire casings and belts for example, my invention also materially assists in minimizing or retarding ply separation. Again, in rubber footwear and in rubber clothing, the useful life of the product is frequently measured by lack of fatigue resistance rather than by wear and my invention is thus of special value in this connection.

In another aspect, my invention enables the development of maximum values for several distinct properties through choice of compounding materials and proportioning of the compound in that it enables independent, at least less involved, treatment of the property of fatigue resistance. For example, my invention frees the manufacturer of rubber goods from indirect restrictions on the proportions in which particular compounding ingredients, sulfur and carbon black for example, can be used.

In still another aspect, my invention assists in reducing adverse effects of overvulcanization, thus making the precise period of vulcanization less critical with respect to the development of optimum properties in the vulcanized product.

My invention is predicated upon observed results and not upon any hypothesis as to the underlying mechanism by which those results are secured. It appears, however, that resistance to aging and resistance to fatigue are both a function of the rate of oxidation of the rubber, that catalytic antioxidants are effective as inhibitors, negative catalysts, with respect to oxidation of the rubber by the oxygen content of the atmosphere to which it may be exposed, that such catalytic antioxidants are, however, not wholly effective to inhibit oxidation of the rubber by dissolved or adsorbed oxygen, and that in the presence of appropriate bases appropriate organic reducing agents will eliminate such dissolved or adsorbed oxygen and thus render the catalytic antioxidants used in conjunction with such organic reducing agents, in accordance with my invention, more fully effective to accomplish their intended purpose.

I claim:

1. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber.

2. In the manufacture of vulcanized rubber products, the improvement which comprises subjecting to vulcanization a rubber compound including a catalytic anti-oxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur-bearing accelerator.

3. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber and not more than about 2.5% by weight of sulphur on the rubber.

4. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber and not more than about 1% by weight of sulphur on the rubber.

5. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur bearing accelerator and not more than about 2.5% by weight of sulphur on the rubber.

6. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur bearing accelerator and not more than about 1% by weight of sulphur on the rubber.

7. In the manufacture of vulcanized rubber products, the improvement which comprises subjecting to vulcanization a rubber comopund including carbon black, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber.

8. In the manufacture of vulcanized rubber products, the improvement which comprises subjecting to vulcanization a rubber compound including carbon black, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur-bearing accelerator.

9. In the manufacture of vulcanized rubber products, the improvement which comprises subjecting to vulcanization a rubber compound including a vulcanizing agent of the class consisting of selenium and tellurium, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber and not more than about 2.5% by weight of sulphur on the rubber.

10. In the manufacture of vulcanized rubber products, the improvement which comprises subjecting to vulcanization a rubber compound including a vulcanizing agent of the class consisting of selenium and tellurium, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur-bearing accelerator and not more than about 2.5% by weight of sulphur on the rubber.

11. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, pyrogallol and an organic base non-volatile at the vulcanization temperature and miscible with rubber effective to activate the oxygen absorber.

12. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, pyrogallol, and an organic base non-volatile at the vulcanization temperature and miscible with rubber effective to activate the oxygen absorber, and a sulphur-bearing accelerator.

13. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, pyrogallol and an organic base non-volatile at the vulcanization temperature and miscible with rubber effective to activate the oxygen absorber and not more than about 2.5% by weight of sulphur on the rubber.

14. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, pyrogallol and an organic base non-volatile at the vulcanization temperature and miscible with rubber effective to activate the oxygen absorber and not more than about 1% by weight of sulphur on the rubber.

15. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, hydroquinone and an organic base non-volatile at the vulcanization temperature and miscible with rubber effective to activate the oxygen absorber.

16. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, hydroquinone and an organic base non-volatile at the vulcanization temperature and miscible with rubber effective to activate the oxygen absorber, and a sulphur-bearing accelerator.

17. In the manufacture of vulcanized rubber products, the improvement which comprises subjecting to vulcanization a rubber compound including a catalytic antioxidant effective to inhibit oxidation of the rubber by the oxygen content of the atmosphere to which it may be exposed, hydroquinone and an organic base non-volatile at the vulcanization temperature and miscible with rubber effective to activate the oxygen absorber and not more than about 2.5% by weight of sulphur on the rubber.

18. In the manufacture of vulcanized rubber products, the improvement which comprises subjecting to vulcanization a rubber compound including a catalytic antioxidant effective to inhibit oxidation of the rubber by the oygen content of the atmosphere to which it may be exposed, hydroquinone and an organic base non-volatile at .e vulcanization temperature and miscible with rubber effective to activate the oxygen absorber and not more than about 1% by weight of sulphur on the rubber.

19. In the manufacture of vulcanized rubber products, the improvement which comprises subjecting to vulcanization a rubber compound including phenyl-$\beta$-naphthalamine, an organic oxygen absorber effective to eliminate oxygen initially present in the compound, and an organic base non-volatile at the vulcanization temperature and miscible with rubber effective to activate the oxygen absorber.

20. In the manufacture of vulcanized rubber products, the improvement which comprises subjecting to vulcanization a rubber compound including secondary aromatic amines, an organic oxygen absorber effective to eliminate oxygen initially present in the compound, and an organic base non-volatile at the vulcanization temperature and miscible with rubber effective to activate the oxygen absorber.

21. In the manufacture of vulcanized rubber products, the improvement which comprises subjecting to accelerated vulcanization a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber.

22. The product of vulcanization of a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber.

23. The product of vulcanization of a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur-bearing accelerator.

24. The product of vulcanization of a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber and not more than about 2.5% by weight of sulphur on the rubber.

25. The product of vulcanization of a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber and not more than about 1% by weight of sulphur on the rubber.

26. The product of vulcanization of a rubber compound including a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur bearing accelerator and not more than about 2.5% by weight of sulphur on the rubber.

27. The product of vulcanization of a rubber compound including carbon black, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber.

28. The product of vulcanization of a rubber compound including carbon black, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber, and a sulphur-bearing accelerator.

29. The product of vulcanization of a rubber compound including a vulcanizing agent of the class consisting of selenium and tellurium, a catalytic antioxidant effective to inhibit oxidation of the rubber by the oxygen content of the atmosphere to which it may be exposed, an organic oxygen absorber effective to eliminate oxygen initially present in the compound and an organic base non-volatile at the vulcanization temperature and miscible with rubber effective to activate the oxygen absorber and not more than about 2.5% by weight of sulphur on the rubber.

30. The product of vulcanization of a rubber compound including a catalytic antioxidant effective to inhibit oxidation of the rubber by the oxygen content of the atmosphere to which it may be exposed, pyrogallol and an organic base non-volatile at the vulcanization temperature and miscible with rubber effective to activate the oxygen absorber.

31. The product of vulcanization of a rubber compound including a catalytic antioxidant effective to inhibit oxidation of the rubber by the oxygen content of the atmosphere to which it may be exposed, hydroquinone and an organic base non-volatile at the vulcanization temperature and miscible with rubber effective to activate the oxygen absorber.

32. The product of vulcanization of a rubber compound including secondary aromatic amines, an organic oxygen absorber effective to eliminate oxygen initially present in the compound and an organic base non-volatile at the vulcanization temperature and miscible with rubber effective to activate the oxygen absorber.

ALBERT A. SOMERVILLE.